March 11, 1930. W. STUEBING, JR 1,750,289
LIFTING TRUCK
Original Filed July 21, 1927  2 Sheets-Sheet 2
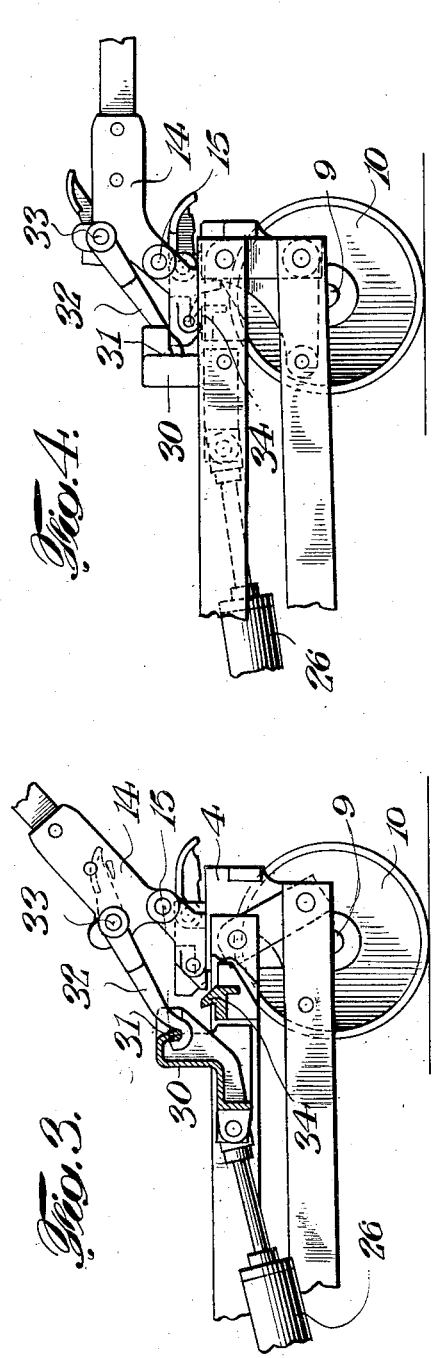
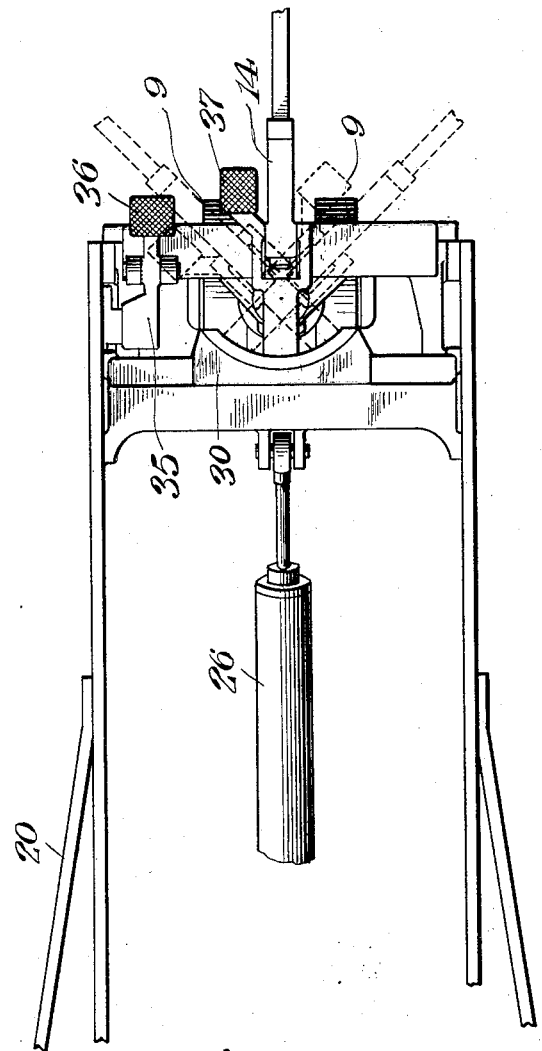
Inventor
William Stuebing Jr.
By Attorneys
Emery, Booth, Janney & Varney Patented Mar. 11, 1930

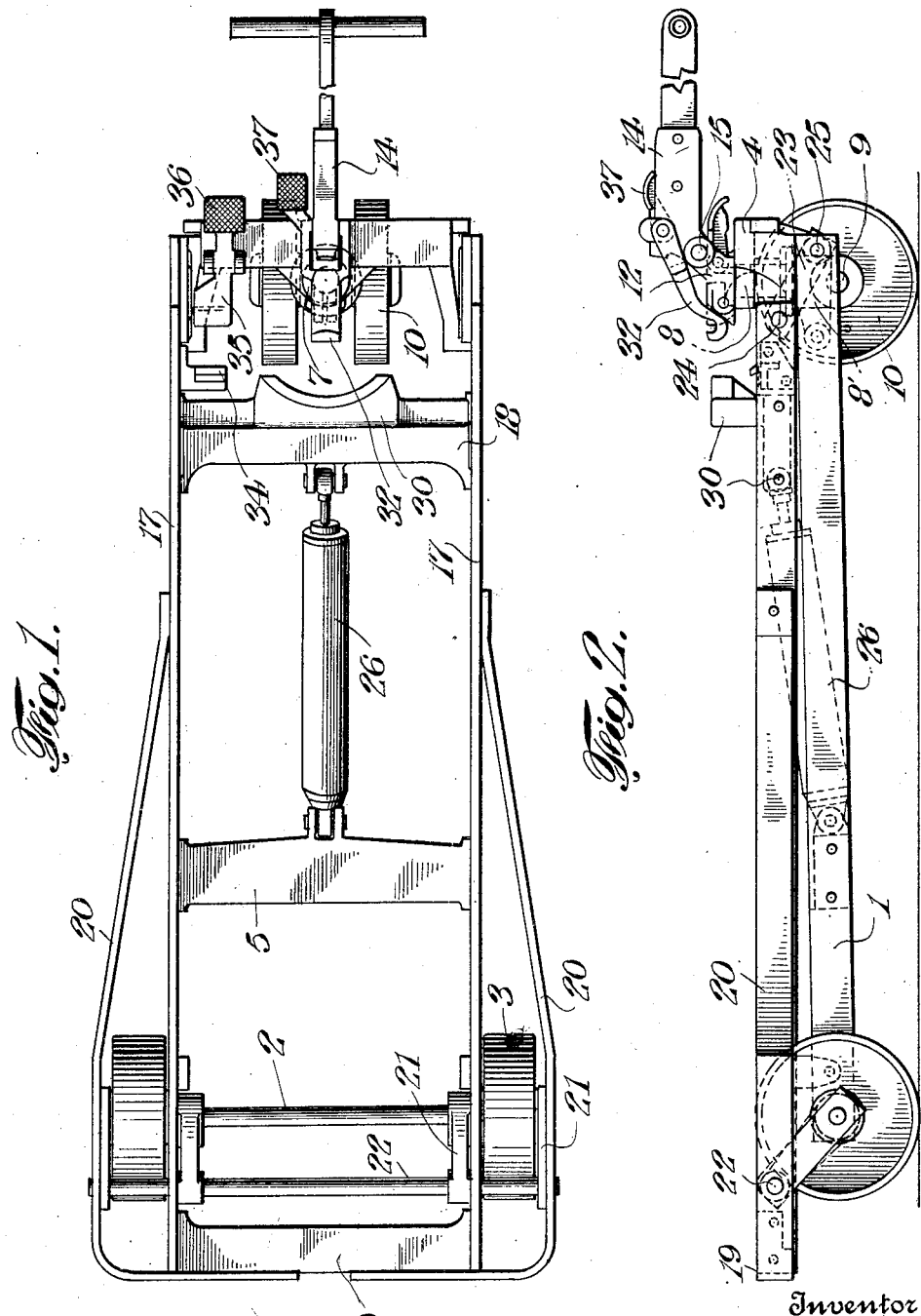

1,750,289

UNITED STATES PATENT OFFICE

WILLIAM STUEBING, JR., OF CINCINNATI, OHIO, ASSIGNOR, BY MESNE ASSIGNMENTS, TO THE YALE & TOWNE MANUFACTURING COMPANY, OF STAMFORD, CONNECTICUT, A CORPORATION OF CONNECTICUT

LIFTING TRUCK

Application filed July 21, 1927, Serial No. 207,470. Renewed February 19, 1929.

This invention relates to lifting trucks and pertains more particularly to trucks in which a load may be lifted by movement of the steering and draft handle, and in which the load may be lifted while the said handle is located in a position to either side of its normal central position as well as when it is in normal central position.

It is an object of the invention to provide a truck of extremely simple construction in which all of the operating parts are located as far as possible from the load in order that they may be easily manipulated by the operator, and also in order that they may be more or less protected from damage due to careless handling of the load.

Other objects and advantages of the invention will appear hereinafter.

A preferred embodiment of the invention selected for purposes of illustration is shown in the accompanying drawings, in which, Figure 1 is a top plan view of the truck.

Figure 2 is a side elevation.

Figures 3, 4 and 5 are fragmentary views, Figure 3 showing the lifting mechanism in the process of lifting the platform, Figure 4 shows the platform locked in elevated position, and Figure 5 shows the manner in which the steering handle may operate the lifting mechanism from the side as well as from the front of the truck.

Referring to the drawings, and particularly to Figures 1 and 2, the truck comprises a lower frame including the side bars 1, the rear ends of which are carried upon the shaft 2 upon which are mounted the rear wheels 3. The front ends of the bars 1 are rigidly connected by the yoke 4 and additional rigidity is given to the lower frame by means of the cross beam 5 which may be conveniently secured to the bars 1 somewhat to the rear of their mid points.

Mounted in the yoke 4 is a bearing 7 through which extends a shaft 8 terminating in a fork 8' carrying a transverse shaft 9 upon which are mounted the front wheels 10 of the truck. Secured to the upper end of the shaft 8 is a collar 12 upon which the steering and draft handle 14 is pivoted at 15. As will be observed, the truck may be steered by swinging the handle 14 in a horizontal plane, causing the shaft 8 to rotate in the bearing 7.

The upper or elevating frame of the truck comprises the side bars 17 which are secured together near their forward ends by means of the yoke 18 and at their rear ends by means of the cross beam 19. In order to widen the elevating frame at its rear end, the wings 20 are provided which may be secured to the bars 17 in any suitable manner. The elevating frame is mounted to permit upward movement with respect to the lower frame, and accordingly the rear end of the elevating frame may be connected to the rear end of the lower frame by means of the links 21 the upper ends of which are mounted on the shaft 22 extending through the bars 17 and the wings 20, and the lower ends of which are mounted on the shaft 2. The forward end of the elevating frame is connected to the forward end of the lower frame by means of links 23 which are pivotally connected to the upper and lower frames at points 24 and 25 respectively. Thus, as will be apparent, the upper frame may be swung upwardly away from the lower frame upon the links 21 and 23. Preferably a check 26 is provided and pivotally connected to the upper and lower frames at suitable points in order to retard the downward movement of the upper frame.

An upwardly extending member 30 is preferably formed integrally with the yoke 18. The said member is provided with a depending flange 31 which is arcuate in shape and is thus adapted to be engaged by the lifting hook 32 which is pivoted at 33 on the handle 14. As will be observed, due to the arcuate shape of the flange 31, the lifting hook 32 may be caused to engage the same either when the steering handle 14 is in its normal central position or when the steering handle is moved to either side of its normal central position.

It is desirable that means be provided for holding the elevating frame in raised position and accordingly there is secured to the upper frame a latch 34 which is adapted to be engaged by the locking lever 35 when the elevating frame has been raised to its upper position. When it is desired to permit the elevating frame to return to its lower position, the pedal 36 may be depressed to disengage the latch thus permitting the elevating frame to drop by gravity.

In using the truck, when it is desired to raise the elevating platform, the handle 14 is swung to approximately vertical position, thus causing the lifting hook 32 to move to a position beneath but out of engagement with the flange 31. The operator then depresses the pedal 37 to raise the rear end of the hook 32 to cause it to engage the flange 31. If then the handle 14 is depressed, the elevating platform will be raised through the stage shown in Figure 3 to the position shown in Figure 4. Upon reaching the position shown in Figure 4 the locking lever 35 will engage the latch 34 to hold the elevating frame in raised position. The handle 14 may then be raised slightly to disengage the lifting hook 32, and the truck may then be pulled and steered by the handle 14 without again engaging the elevating frame with the hook 32. After the truck has been moved to the desired position, if it is desired to lower the elevating frame, the pedal 36 is depressed to release the latch and the elevating frame moves slowly back to normal position, such movement being retarded by the check 26. As will be observed, the truck may be pulled and steered while the elevating frame is in its lower position as well as when in its raised position, without engaging the elevating frame with the lifting hook.

It will be understood that the invention may be variously modified and embodied within the scope of the subjoined claims.

I claim as my invention:

1. A lifting truck comprising, in combination, a lower frame, an elevating frame, a depending flange on said elevating frame, a handle pivotally mounted on said lower frame, a lifting hook pivotally mounted on said handle and extending rearwardly beneath said flange when said handle is raised, said hook being unbalanced so that it remains normally out of engagement with said flange but may be caused to engage the same when swung upwardly from its normal position.

2. A lifting truck comprising, in combination, a lower frame, an elevating frame, a depending arcuate flange on said elevating frame, a steering head rotatably mounted on said lower frame, a handle pivotally mounted on said steering head, a lifting hook pivotally mounted on said handle and extending rearwardly beneath said arcuate flange when said handle is in either its normal central position or to either side thereof, said hook being unbalanced so that it remains normally out of engagement with said flange but may be caused to engage the same when swung upwardly from its normal position.

3. A lifting truck comprising, in combination, a lower frame having a swivelled steering head, an elevating frame mounted on the main frame and movable upwardly relative thereto, a vertically swinging steering handle, a direct connection between the steering handle and the elevating frame comprising a depending flange on said elevating frame and a lifting hook pivotally mounted on said handle, said hook being unbalanced so that it remains normally out of engagement with said flange in all positions of said handle.

4. A lifting truck comprising in combination a main frame, an elevating frame having a depending flange, a handle pivotally mounted on said main frame, means for operatively connecting said handle and the elevating frame including a lifting member pivotally mounted on said handle and normally disengaged from said flange, and means for moving one end of said lifting member into lifting engagement with said flange.

In testimony whereof, I have signed my name to this specification this 15th day of July, 1927.

WILLIAM STUEBING, Jr.